F. DUESTERHOFF.
BELT GUIDE.
APPLICATION FILED JAN. 28, 1909.

994,910.

Patented June 13, 1911.

WITNESSES

INVENTOR
FRANK DUESTERHOFF
BY Paul & Paul
HIS ATTORNEYS

UNITED STATES PATENT OFFICE.

FRANK DUESTERHOFF, OF SILVER LAKE, MINNESOTA.

BELT-GUIDE.

994,910.

Specification of Letters Patent.   Patented June 13, 1911.

Application filed January 28, 1909.   Serial No. 474,851.

*To all whom it may concern:*

Be it known that I, FRANK DUESTERHOFF, of Silver Lake, McLeod county, Minnesota, have invented certain new and useful Improvements in Belt-Guides, of which the following is a specification.

The object of my invention is to provide means, which will prevent a belt from running off a pulley, the device being particularly useful in connection with the belt between a threshing engine and a separator, where considerable difficulty is experienced in keeping the belt on the pulley, particularly when a strong wind is blowing. I do not confine myself however, to this application alone of the invention, as it is capable of use and will perform its functions satisfactorily wherever it is desired to use a belt and prevent it from running off either end of the pulley.

My invention consists generally in means at each end of the pulley for causing the automatic tilting of the pulley to direct the belt toward the center thereof, in case it works too far off either end of the pulley.

Figure 1:
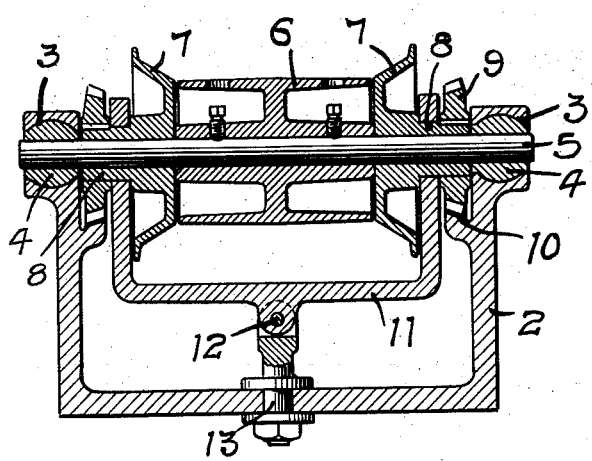
Figure 2:
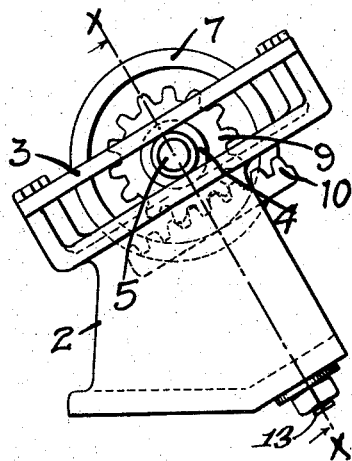
Figure 3:
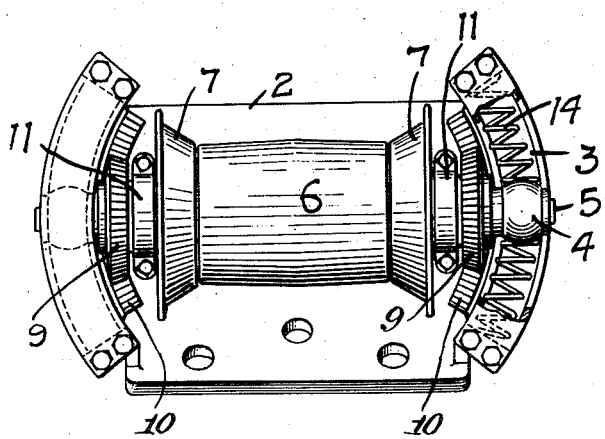
Figure 4:
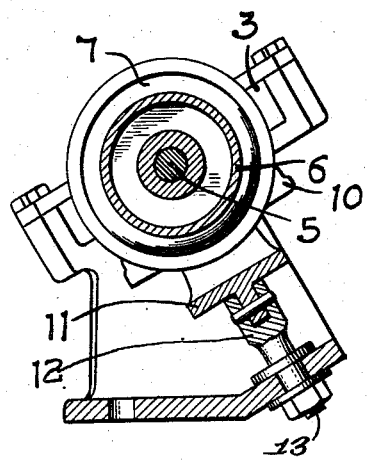

In the accompanying drawings forming part of this specification, Figure 1 is a sectional view of a belt guide, embodying my invention, taken substantially on the line X—X of Fig. 2, Fig. 2 is an end view of the same, Fig. 3 is a plan view, Fig. 4 is a transverse sectional view.

In the drawing, 2 represents a suitable frame having curved, inclined guide ways 3 therein, adapted to receive bearings 4, which are mounted on the ends of a shaft 5. These bearings are adapted to slide back and forth in the guide ways to accommodate themselves to the inclination or angle of the shaft. A pulley 6 is secured on this shaft and at each end of the pulley I provide cones 7 having elongated hubs 8, which are journaled on the shaft 5. Beveled gear wheels 9 are keyed on the hubs 8 and have their teeth in engagement with inclined racks 10, which are carried by the walls of the base 2. These rack bars are inclined in planes parallel with the plane of inclination of the guide ways 3 and the engagement of the gear wheels 9 with the teeth of the bars 10 will cause the movement of the bearings 4 in said guide ways and raise or lower one end of the shaft 5. A yoke 11 is provided within the casing 2 and has a pivoted joint 12 connecting it with a bolt 13 that is mounted in said base, said yoke having the effect of holding the shaft in place and permitting one end to rise and the other end to drop, through the engagement of the belt with one of the cones 7. This engagement will take place when the belt works off the end of the pulley 6 and rides up on the periphery of the cone at that end. When the engagement of the belt with the cone takes place, the cone and hub will be revolved and that end of the pulley with the shaft and cone will be raised or tilted above the level of the opposite end. Consequently the belt will work off the conical face of the cone 7 toward the center of the pulley. The bolt 13 has a reduced threaded end and a shoulder formed above the thread, with which the nut contacts, thus securing the bolt in the frame while permitting it to oscillate freely in its bearing.

During the movement of one end of the pulley shaft in one direction, its opposite end will move in the other direction until the belt has returned to its normal position on the face of the pulley, when the shaft will gradually work toward the center of the guide ways and the pulley will assume a horizontal position. It will be immaterial which way the belt works, as the operation of the cones at each end of the pulley will be the same and the contact of the belt therewith will cause the revolution of the cone and the movement of the shaft in its guideway and the tilting of the pulley sufficiently to direct the belt back to the center thereof.

In Fig. 3 I have illustrated springs 14 in the guide way on each side of the shaft, which by their tension, serve to keep the bearings of the shaft in the center of the guide way, yielding sufficiently however, to allow the bearing to move back and forth in the guideway and accommodate itself to the tilting of the pulley, caused by the travel of the shaft gear on the rack bar.

I claim as my invention:

1. A belt guide, comprising a frame having curved inclined guide ways therein, and a shaft having bearings in said guide ways, a pulley secured on said shaft, and means provided at the ends of said pulley and engaged by the belt thereon for moving said shaft in said guide ways and tilting said pulley, substantially as described.

2. A belt guide, comprising a frame, a shaft having sliding bearings therein and arranged to move at an angle to the horizontal, a pulley secured on said shaft, cones provided at each end of said pulley and having means for oscillating said shaft in its guide ways to raise or lower either end of said pulley, and a yoke having bearings for said cones on each side of said pulley and a pivotal connection with said frame, substantially as described.

3. A belt guide, comprising a frame having inclined curved guide ways therein, a shaft having bearings in said guideways, and springs in said guide ways upon each side of said shaft, a pulley secured on said shaft, cones mounted on said shaft at each end of said pulley, and means actuated by the contact of the belt with said cones for oscillating said shaft in its guide ways to tilt either end of said pulley, for the purpose specified.

4. A belt guide comprising a frame having curved guideways therein, a shaft having bearings in said ways, a pulley secured on said shaft, and means engaged by the belt on said pulley for oscillating said shaft in said guide-ways.

5. A belt guide comprising a frame, having inclined guideways, a shaft having bearings in said ways, a pulley secured on said shaft and means engaged by the belt on said pulley for oscillating said shaft in said guide-ways and tilting said pulley.

6. A belt guide comprising a frame having inclined guideways, a shaft having bearings in said ways, a pulley secured on said shaft, means engaged by the belt on said pulley for oscillating said shaft in said guide-ways and tilting said pulley, and yielding means for normally centering said pulley with respect to said guide-ways.

In witness whereof, I have hereunto set my hand this 15th day of January 1909.

FRANK DUESTERHOFF.

Witnesses:
RICHARD PAUL,
J. A. BYINGTON.